(12) United States Patent
Nojiri et al.

(10) Patent No.: US 6,780,113 B2
(45) Date of Patent: Aug. 24, 2004

(54) VIDEO GAME SYSTEM, VIDEO GAME APPARATUS, AND METHOD OF CONTROLLING THE VIDEO GAME APPARATUS

(75) Inventors: Kohei Nojiri, Saitama (JP); Hiroshi Udagawa, Tokyo (JP); Koichiro Ishigami, Kanagawa (JP); Haruo Asano, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/948,394

(22) Filed: Sep. 7, 2001

(65) Prior Publication Data

US 2002/0068636 A1 Jun. 6, 2002

(30) Foreign Application Priority Data

Sep. 8, 2000 (JP) .......................... 2000-274197

(51) Int. Cl.[7] ........................... A63F 13/00; A63F 9/24; G06F 17/00; G06F 19/00
(52) U.S. Cl. ........................... 463/47; 463/43
(58) Field of Search ................ 463/47, 40–43, 463/30–32, 19; 273/269–270; 345/339, 349

(56) References Cited

U.S. PATENT DOCUMENTS

| | | | |
|---|---|---|---|
| 5,224,416 A | | 7/1993 | Malin et al. |
| 5,678,002 A | | 10/1997 | Fawcett et al. |
| 5,718,631 A | * | 2/1998 | Invencion ................ 463/19 |
| 5,759,102 A | | 6/1998 | Pease et al. |
| 5,974,474 A | | 10/1999 | Furner et al. |
| 5,993,088 A | | 11/1999 | Nogay et al. |
| 6,160,551 A | * | 12/2000 | Naughton et al. ........ 345/769 |
| 6,336,865 B1 | * | 1/2002 | Kinjo .................... 463/34 |

FOREIGN PATENT DOCUMENTS

| | | |
|---|---|---|
| EP | 1 175 927 A2 | 1/2002 |
| JP | 10181119 | 7/1998 |
| JP | 11184656 | 7/1999 |
| JP | 11203066 | 7/1999 |
| JP | 09000739 | 1/2001 |

* cited by examiner

Primary Examiner—Teresa Walberg
Assistant Examiner—Robert Mendoza
(74) Attorney, Agent, or Firm—Frommer Lawrence & Haug LLP; William S. Frommer; Hans R. Mahr

(57) ABSTRACT

An object of the present invention is to make it possible to execute a video-game software program read from a video-game program recording medium, to convert contents data to print data, and to enable a printer of an unknown type to print the print data. To achieve the object, a data-reading module determines whether the printer connected to a video game apparatus is of an unknown type (Step S11). If the printer is of an unknown type, or a type not designated by the printer driver, printing parameter is read from the printer, the parameter of a device engine module is changed in accordance with the printing parameter (Step S12). And the print data is printed (Steps S13 to S17).

12 Claims, 7 Drawing Sheets

VIDEO GAME SYSTEM, VIDEO GAME APPARATUS, AND METHOD OF CONTROLLING THE VIDEO GAME APPARATUS

BACKGROUND OF THE INVENTION

1. Field of the Invention

The present invention relates to a video game system and a video game apparatus, either for executing a video-game soft program, thus enabling the user to play a video game. The invention relates to a method of controlling the video game apparatus.

2. Description of the Related Art

Home video games have been provided in various types. Among them are a motorcycle racing games and a car racing games. Another type of home video game is a roll-playing game, in which a character fight with the foe as the player operates a pad, buttons, a lever, or the like. Such a video game consists of "stages." If the player clears a stage, he or she can play the next, more difficult stage. When the player clears the final stage, the video game is over.

With the home video game apparatuses hitherto known, the player can enjoy nothing but images and sound that change as the game proceeds. Even if the player successfully clears the final stage of the game or makes a high score, he or she cannot get a certificate at all.

BRIEF SUMMARY OF THE INVENTION

Accordingly, an object of this invention is to provide a video game system and a video game apparatus, either designed to execute the video-game soft program read from a video-game program recording medium, thereby enabling the user to play the video game, and to change the parameter of the printer driver stored in a nonvolatile memory when a new printer is connected to the apparatus, thereby converting the contents to data that can be printed by the new printer.

Another object of the invention is to provide a method of controlling the video game system and the video game apparatus.

A video game system according to this invention is designed to execute a video-game software program read from a video-game program recording medium, to convert contents to print data and to print the print data. The video game system comprises a video game apparatus and a printer. The video game apparatus comprises: video-game software program reading means for reading the video-game software program from the video-game program recording medium, said video-game software program comprising a video-game program, contents data and printer driver for printing the content data; a nonvolatile memory storing a printer driver comprising a common engine module for processing data about the progress of the game, irrespective of the type of the printer used, a device engine module for processing the data in a particular manner specific to the type of the printer used, and a data-reading module for reading the data about a printer of an unknown type; parameter-changing means for acquiring printing parameter specific to the printer of an unknown type, when the printer of the unknown-type is connected to the video-game software program reading means and for changing the parameter of the device engine module, which are stored in the nonvolatile memory, in accordance with the print parameter acquired; and printing control means for reading the printer driver from the nonvolatile memory, for acquiring printing parameter from the printer by the use of the data-reading module when the printer of the unknown-type is connected to the video-game software program reading means, for changing the parameter of the device engine module in accordance with the printing parameter acquired, for converting the print contents data read from the recording medium by the video-game software program reading means to print data, by the use of the printer driver, and for outputting the print data through a printer-connecting terminal. The printer prints the print data supplied from the video game apparatus.

A video game apparatus according to the invention is designed to execute a video-game software program read from a video-game program recording medium, to convert contents to print data and to print the print data. The video game apparatus comprises: video-game software program reading means for reading the video-game software program from the video-game program recording medium, said video-game software program comprising a video-game program, contents data and printer driver for printing the content data; a nonvolatile memory storing a printer driver comprising a common engine module for processing data about the progress of the game, irrespective of the type of the printer used, a device engine module for processing the data in a particular manner specific to the type of the printer used, and a data-reading module for reading the data about a printer of an unknown type; parameter-changing means for acquiring printing parameter specific to the printer of an unknown type, when the printer of the unknown-type is connected to the video-game software program reading means and for changing the parameter of the device engine module, which are stored in the nonvolatile memory, in accordance with the print parameter acquired; and printing control means for reading the printer driver from the nonvolatile memory, for acquiring printing parameter from the printer by the use of the data-reading module when the printer of the unknown-type is connected to the video-game software program reading means, for changing the parameter of the device engine module in accordance with the printing parameter acquired, for converting the print contents data read from the recording medium by the video-game software program reading means to print data, by the use of the printer driver, and for outputting the print data through a printer-connecting terminal.

A method of controlling a video game apparatus, according to the present invention comprises: reading the video-game software program from a video-game program recording medium, said video-game software program comprising a video-game program, contents data and printer driver for printing the content data; storing a printer driver into a nonvolatile memory, said printer driver comprising a common engine module for processing data about the progress of the game, irrespective of the type of the printer used, a device engine module for processing the data in a particular manner specific to the type of the printer used, and a data-reading module for reading the data about a printer of an unknown type; acquiring printing parameter specific to a printer of an unknown type, when the printer of the unknown-type is connected to the video game apparatus, and changing the parameter of the device engine module in accordance with the print parameter acquired; and converting the print contents data read from the recording medium to print data, by the use of the printer driver, and printing the print data.

DETAILED DESCRIPTION OF THE INVENTION

An embodiment of the present invention will be described in detail, with reference to the accompanying drawings.

Figure 1:
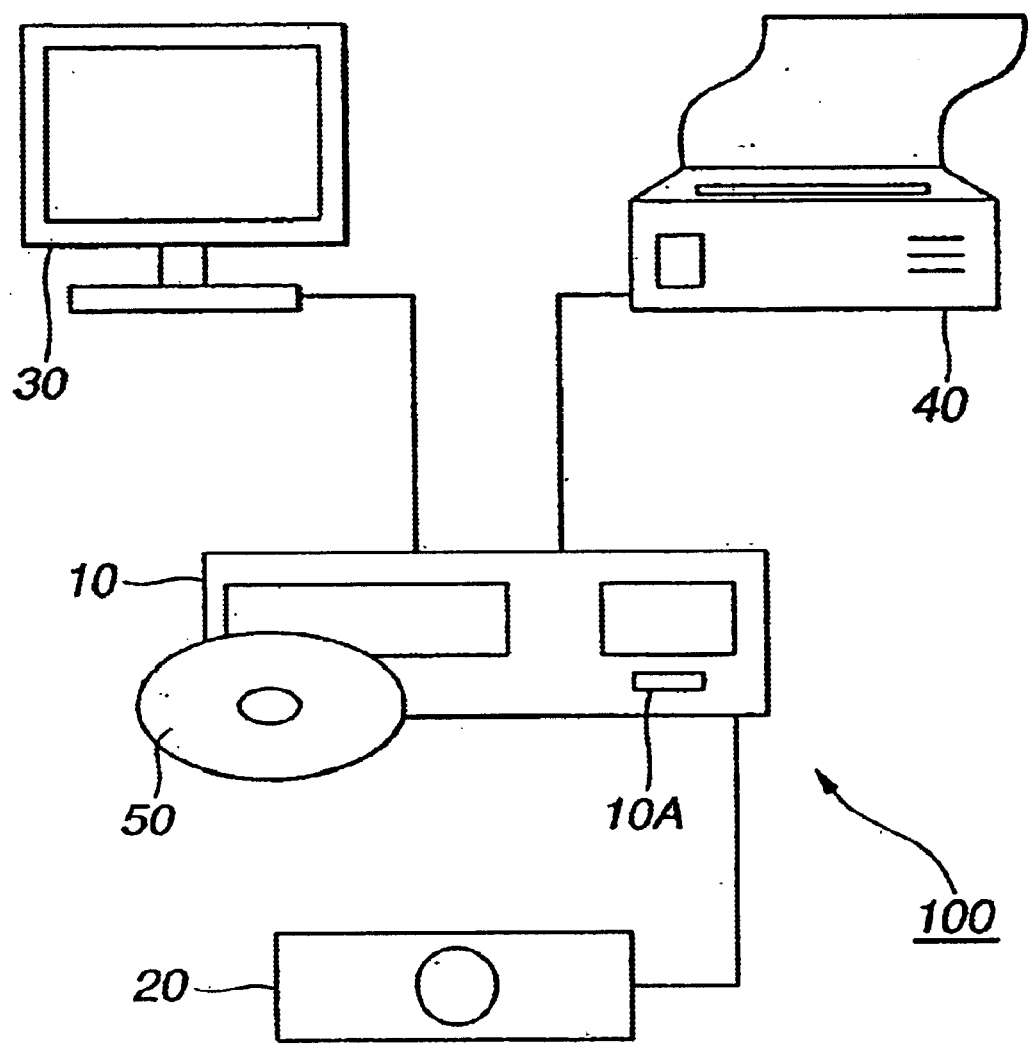
FIG. 1 is a diagram illustrating a home game system according to the present invention.

The present invention is applied to, for example, a home game system 100 of the type shown in FIG. 1.

As FIG. 1 shows, the home game system 100 comprises a video game apparatus 10, a memory card 10A, a controller 20, an image display 30, and a printer 40. The memory card 10 comprises a nonvolatile memory and is removably inserted in the video game apparatus 10. The controller 20, image display 30 and printer 40 are connected to the video game apparatus 10.

Figure 2:
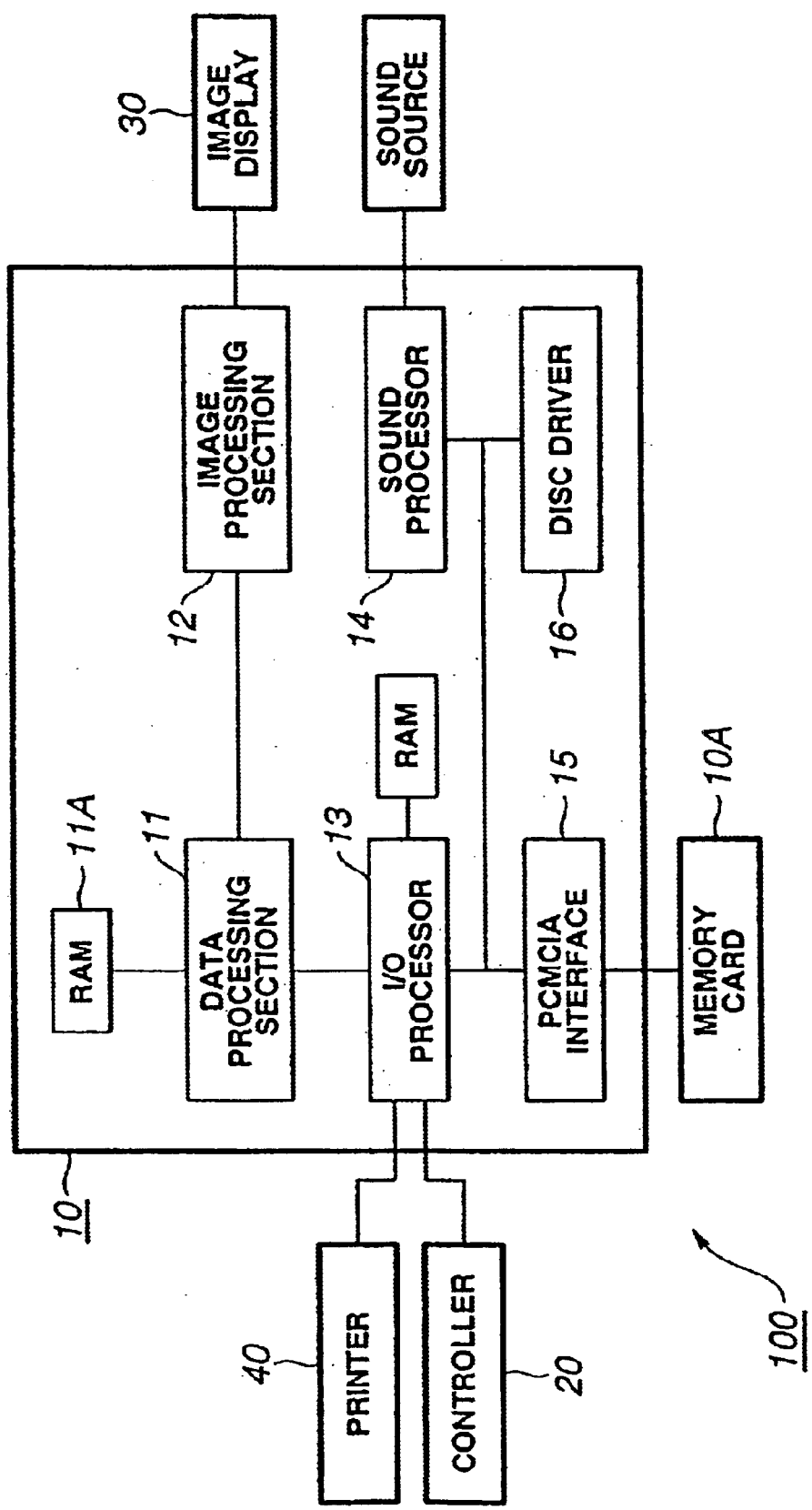
FIG. 2 is a block diagram showing the hardware configuration of the video game apparatus incorporated in the home game system.

FIG. 2 illustrates the hardware configuration of the video game apparatus 10. The video game apparatus 10 is designed to execute the video-game soft program read from a video-game program recording medium 50 such as a CD-ROM or a DVD. The user of the apparatus 10 can therefore play the video game.

As shown in FIG. 2, the apparatus 10 comprises a data processing section 11, an image processing section 12, an I/O processor 13, a sound processor 14, a PMCIA interface 15, and a disc driver 16. The data processing section 11 is called "emotion engine," and the image processing section 12 is called "graphics synthesizer." The I/O processor 13 serves to control peripheral devices. The sound processor 14 processes sound-source data. The PMCIA interface 15 is provided to connect card-shaped peripheral devices to the apparatus 10. The disc drive 16 is used to read data from the video-game program recording medium 50.

These hardware components operate under the control of the software, managing input/output devices, processing image data, processing sound data, controlling the image display 30 and the printer 40, and managing a network, thereby to keep the game going and to print privilege data about any stage of the game when the user clears the stage.

In the video game apparatus 10, a USB (Universal Serial Bus) and in IEEE1394 bus are mounted on the I/O processor 13. The USB and the IEEE1394 bus are used as physical means for connecting the I/O processor 13 to external devices. For example, the USB connects the I/O processor 13 to the printer 40.

Thus, the printer 40 can print data under the control of a printer driver API, by the use of the data processing section 11 and the printer driver installed in I/O processor 13.

Figure 3:
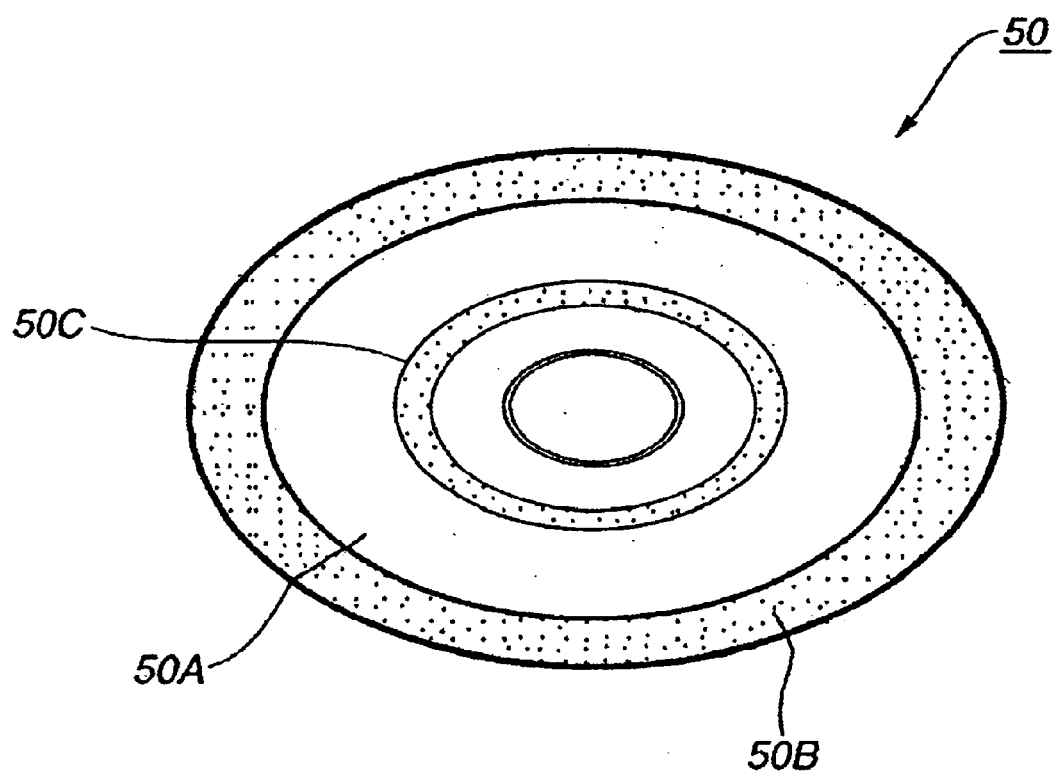
FIG. 3 is a schematic representation of a video-game program recording medium that may be used in the home game system.

As indicated above, the video game apparatus 10 uses the video-game program recording medium 50. The video-game soft program is recorded on the medium 50. As FIG. 3 shows, the program includes a main part 50A, privilege data 50B, and printer driver 50C. The privilege data 50B corresponds to the stages of the video game performed in accordance with the video-game soft program. The printer driver 50C is a printer-controlling program that causes the printer 40 to print the privilege data 50B when the player clears any stage of the video game.

In the video game apparatus 10, the image processing section 12 reads the video-game soft program into the memory 11A from the video-game program recording medium 50 such as a CD-ROM or a DVD. The data processing section 11 executes the program, generating video data and audio data as the video game proceeds. When the player operates the operation means such as a pad, buttons or a lever (not shown), the I/O processor 13 detects this fact. The data representing the fact is supplied from the I/O processor 13 to the data processing section 11.

The data processing section 11 executes the video-game soft program, as will be described with reference to the flowchart of FIG. 4.

More specifically, the data processing section 11 designates a stage number N to start executing the video-game soft program (Step S1). The section 11 then starts executing the stage of the game, which is identified with the number N designated (Step S2).

Next, the data processing section 11 determines whether the stage No. N has been cleared or not (Step S3). If NO, that is, if the stage of number N has not been cleared, the operation returns to Step S2. In this case, Steps S2 and S3 are repeated, whereby the stage of number N is continued. If YES, that is, if the stage of number N has been cleared, the data processing section 11 reads the privilege data corresponding to the stage of number N (Step S4). The section 11 then converts the privilege data to print data (Step S5).

The disc drive 16 reads the printer driver from the video-game program recording medium 50 and supplies the print data to the printer 40, which prints the print data (Step S6). The data processing section 11 determines whether the printer 40 has printed the data as is desired (Step S7). If NO, or if the printer 40 has failed to print the data as desired, the operation returns to Step S6, in which the printer 40 prints the data again.

If YES in Step S7, that is, if the printer 40 has printed the data as desired, the stage number N is increased by one (Step S8).

Then, the data processing section 11 determines whether the player has selected the termination of the game (Step S9). If YES, that is, if the player has selected the termination of the game, the section 11 terminates the game. If NO, that is, if the player has not selected the termination of the game, the operation returns to Step S2. In this case, the section 11 starts executing the stage of the game, which is identified with the next stage number N.

Thus, whenever the player clears any stage of the video game that proceeds in accordance with the video-game soft program read from the recording medium 50, he or she obtains the right to print the privilege data that corresponds to the game state just cleared.

The sheet on which the privilege data is printed is valuable to the player, because it may give him or her prestige or reward. More specifically, the player can exchange the printed sheet for the certificate proving that he has clear that stage of the game. Alternatively, the player may exchange the sheet for a comic book, a coupon, a certificate, a collector's item, a trading card, a portrait of his or her favorite personality, a catalog, a discounted ticket for a game program, an ID password or address for accessing a service provider, or the like.

Figure 5A:
FIGS. 5A to 5D show four examples of privilege data that can be printed in the home game system.
Figure 5B:
Figure 5C:
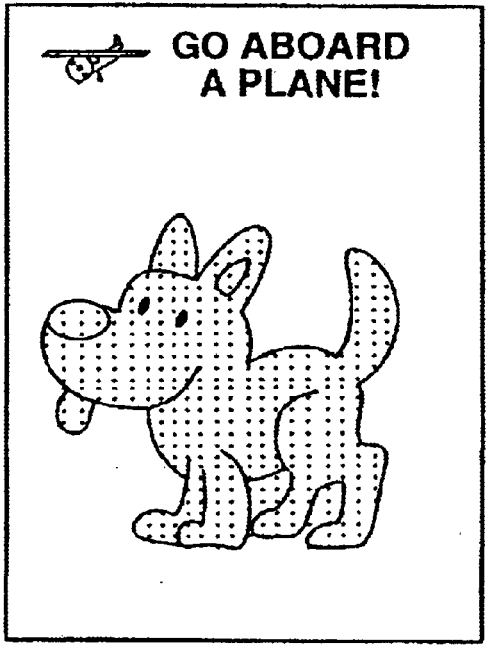
Figure 5D:

FIG. 5A shows a coupon. FIG. 5B illustrates a certificate. FIG. 5C depicts a collector's item. FIG. 5D shows a discounted ticket for a game program.

Figure 4:
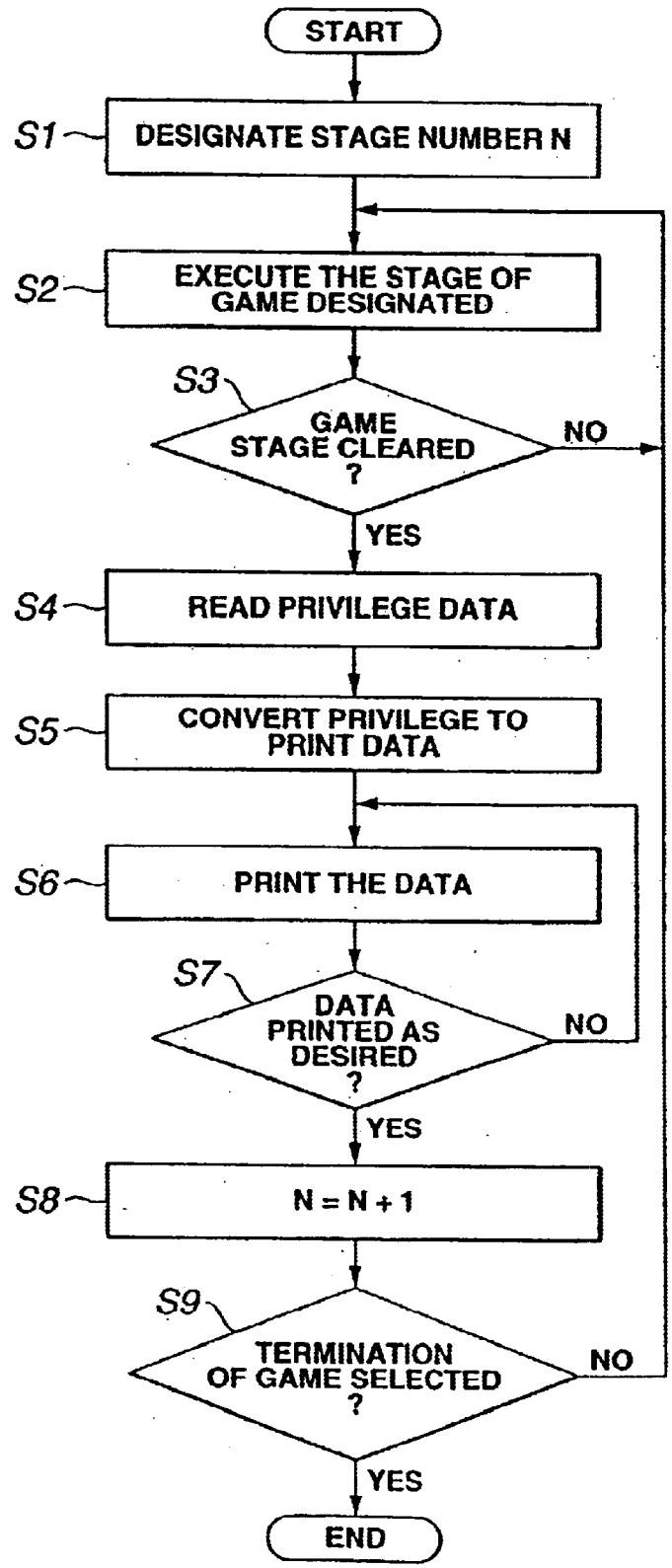
FIG. 4 is a flowchart explaining how the processor provided in the video game apparatus executes a video-game soft program.

As shown in the flowchart of FIG. 4, the printer 40 prints the privilege data at the time that the player clear the stage of the game. The privilege data may not be printed, and the player may preserve the right to print the data or abandon the right when he or she clears the stage of the game. The player's name, address, telephone number and the like may be printed along with the privilege data. Further, the disc drive 15 may read the printer driver from the recording medium 50 before the player starts playing the game.

In the video game apparatus 10, the printer driver is stored into the memory card 10A that is a nonvolatile memory, along with game-progress data representing how far the game has progressed. The data processing section 11 reads the printer driver from the memory card 10A and stored into the memory 11A and then wait for a print command the player may input. When the player inputs a print command, the section 11 converts the contents to be printed, to print data. The print data is supplied to the printer 40, in accordance with the printer driver stored in the memory 11A. The printer 40 prints the print data.

The printer driver is supplied to the data processing section 11 and I/O processor 13 under the control of a printer driver API in the video game apparatus 10. The printer driver comprises a common engine module, a device engine module, and a data-reading module. The common engine module processes data, irrespective of the type of the printer used. The device engine module processes data in a particular manner specific to the type of the printer used. The data-reading module is configured to read the data about a device of an unknown type that may be connected to the video game apparatus 10. The data-reading module acquires print parameter depending on the unknown type of the device and can render the apparatus 10 compatible with the device of the unknown type.

Figure 6:
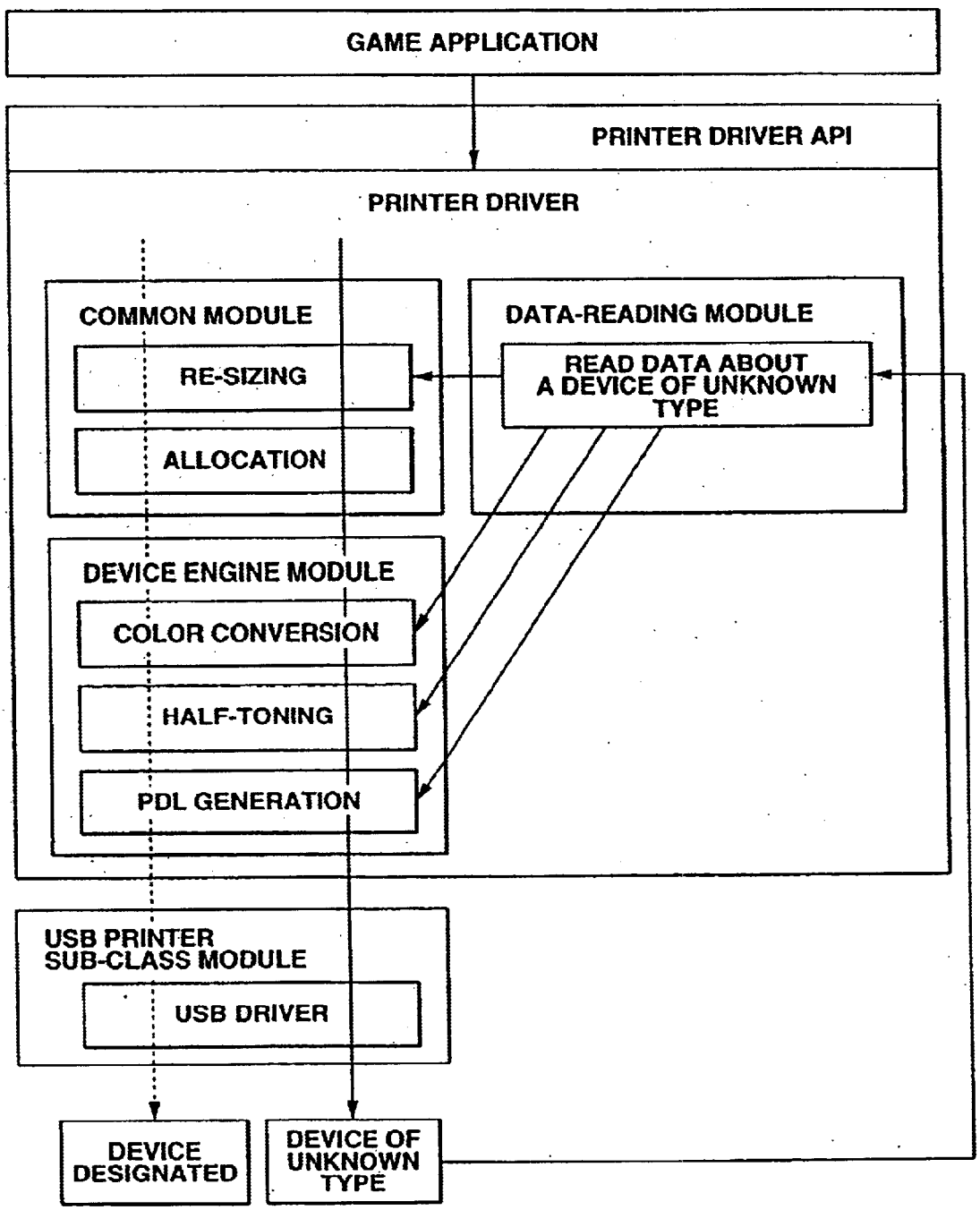
FIG. 6 is a diagram illustrating the software configuration of the printer control function provided in the video game apparatus.

The printer is controlled in the video game apparatus 10, by means of the software configuration illustrated in FIG. 6.

Figure 7:
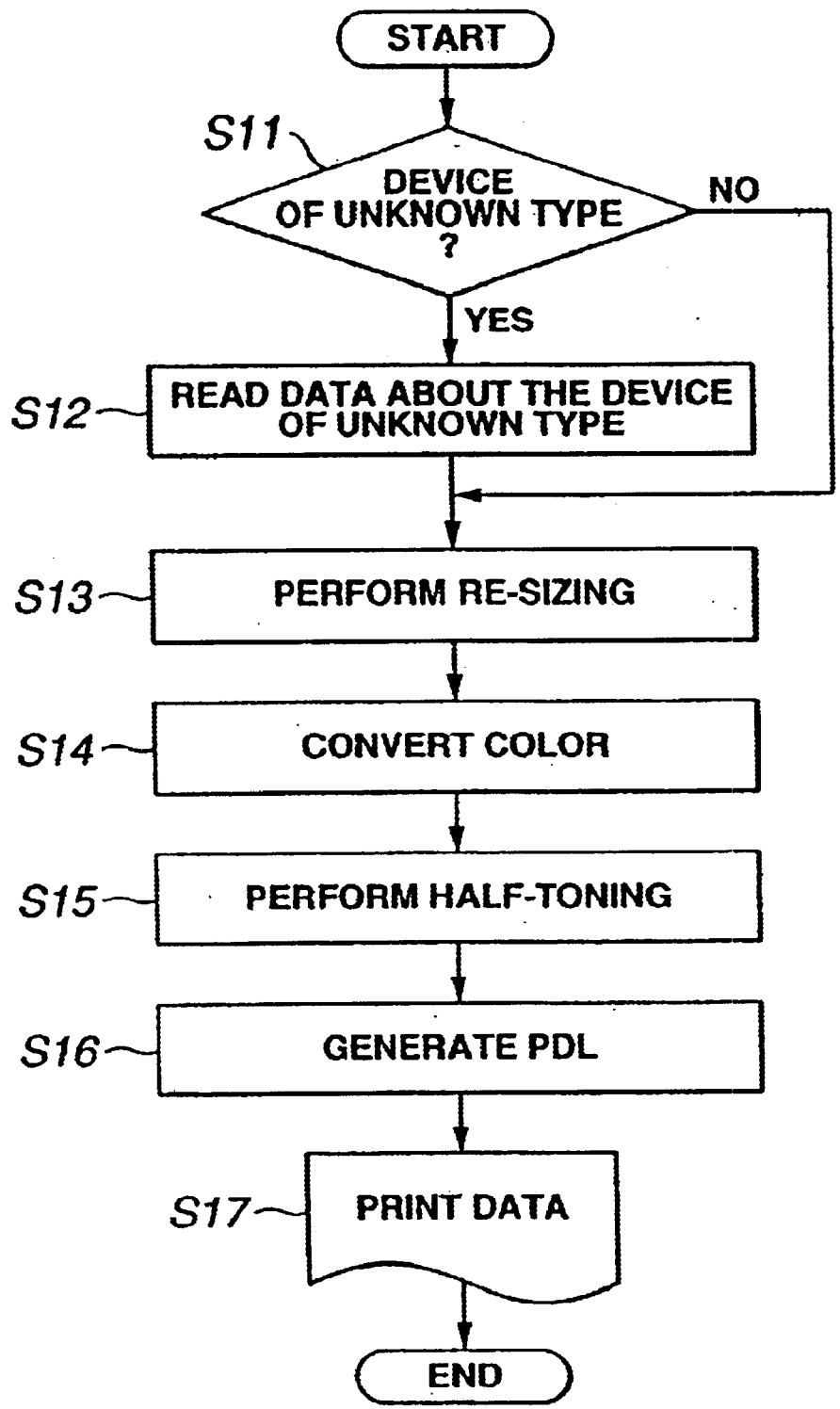
FIG. 7 is a flowchart showing the sequence of printing data that the video game apparatus performs.

The video game apparatus 10 incorporating the printer driver causes the printer 40 to print data, as will be explained with reference to the flowchart of FIG. 7.

In Step S11, the data-reading module determines whether the printer 40 connected to the video game apparatus 10 is of an unknown type.

If NO in Step S11, that is, if the printer 40 connected to the video game apparatus 10 is of the type designated by the printer driver, the operation goes to Step S13. If YES in Step S11, that is, if the printer 40 connected to the video game apparatus 10 is of an unknown type, or a type not designated by the printer driver, the operation jumps to Step S12. In Step S12, printing parameter is read from the printer 40, the parameter of the device engine module is changed in accordance with the printing parameter. The operation then goes to Step S13.

In Step S13, the common engine performs resolution conversion (i.e., re-sizing), and activating the device engine module.

In Step S14, the device engine module coverts the color of print contents. (For example, RGB 8-bit pixels are converted to CMYK 8-bit pixels.) In Step S15, the device engine module performs half-toning (that is, the CMYK 8-bit pixels are converted to CMYK 2-bit pixels). In Step S16, the device engine module translates the printing control command specific to the printer 40, thereby generating print data PDL.

In Step S17, the USB printer substrate-class module transmits the print data PDL to the USB driver of the I/O processor 13. The USB driver of the I/O processor 13 transmits a print command to the USB port of the printer 40 through a USB cable that connects the printer 40 to the video game apparatus 10. In response to the print command, the printer 40 starts printing the data.

Thus, the printer driver performs re-sizing, color conversion and half-toning on the print contents (i.e., RGB bit-map images) acquired from the game application program in the video game apparatus 10. Further, the printer driver generates the print data PDL. The printer driver then transmits the print command to the printer 40 connected to the video game apparatus 10. The printer 40 prints the print contents in response to the print command.

If the printer 40 connected to the video game apparatus 10 is of an unknown type, or a type not designated by the printer driver, the printing parameter is read from the printer 40 by the data reading module. The parameter of the device engine module is changed in accordance with the printing parameter. The re-sizing, color conversion and half-toning on the print contents (i.e., RGB bit-map images) acquired from the game application program are sequentially performed in the video game apparatus 10. Further, the print data PDL is generated, the print command is transmitted to the printer 40 USB-connected to the apparatus 10, and the printer 40 prints the print contents in response to the print command.

In the home game system 100, the printer 40 connected to the video game apparatus 10 can print the data read from any game software that has already been shipped. Even if the printer 40 is of an unknown type, it can print the data read from any game application program designed for the printer of the type designated by the printer driver. This means an increase in the number of application programs that can be used in the home game system 100. This also means that the data read from any game application program can be printed by new types of printers, without the necessity of revising the game application program.

As has been described, the video-game software program from a video-game program recording medium in the present invention. The video-game software program consists of a video-game program, content data and printer driver for printing the content data. A printer driver is stored in a nonvolatile memory. The printer driver consists of a common engine module for processing data about the progress of the game, irrespective of the type of the printer used, a device engine module for processing the data in a particular manner specific to the type of the printer used, and a data-reading module for reading the data about a printer of an unknown type. The printing parameter specific to a printer of an unknown type is acquired when the printer of the unknown-type is connected to the video game apparatus. The parameter of the device engine module is changed in accordance with the print parameter acquired. The printer driver is read from the nonvolatile memory and stored into a work memory. The print contents data read from the recording medium are converted to print data, by the use of the printer driver. A printer can print the print data thus obtained, even if it of an unknown type.

What is claimed is:

1. A video game system designed to execute a video-game software program read from a video-game program recording medium, to convert contents data to print data, and to print the print data, said system comprising:

a video game apparatus comprising:
- (a) video-game software program reading means for reading the video-game software program from the video-game program recording medium, said video-game software program comprising a video-game program, contents data indicating at least one privilege item, and a printer driver for printing the contents data;
- (b) a nonvolatile memory, separate from the video-game program recording medium, for storing the printer driver, wherein the printer driver comprises a common engine module for processing data about the progress of the game, irrespective of the type of the printer used, a device engine module for processing the data in a particular manner specific to the type of the printer used, and a data-reading module for reading the data about a printer of an unknown type;
- (c) parameter-changing means for acquiring one or more printing parameters specific to the printer of an unknown type when the printer of the unknown type is connected to the video game apparatus, and for changing one or more parameters of the device engine module, which are stored in the nonvolatile memory, in accordance with the one or more printing parameters acquired; and
- (d) printing control means for reading the printer driver from the nonvolatile memory, for acquiring one or more printing parameters from the printer by the use of the data-reading module when the printer of the unknown type is connected to the video game apparatus, for changing one or more parameters of the device engine module in accordance with the one or more printing parameters acquired, for converting the contents data read from the video-game program recording medium by the video-game software program reading means to print data by the use of the printer driver, and for outputting the print data through a printer-connecting terminal; and a printer for printing the print data supplied from the video game apparatus, wherein the contents data for each privilege item is printed when execution of the video-game program indicates that a corresponding stage of the game has been reached.

2. A video game apparatus designed to execute a video-game software program read from a video-game program recording medium, to convert contents data to print data, and to print the print data, said apparatus comprising:

video-game software program reading means for reading the video-game software program from the video-game program recording medium, said video-game software program comprising a video-game program, contents data indicating at least one privilege item, and a printer driver for printing the contents data;

a nonvolatile memory, separate from the video-game program recording medium, for storing the printer driver, wherein the printer driver comprises a common engine module for processing data about the progress of the game, irrespective of the type of the printer used, a device engine module for processing the data in a particular manner specific to the type of the printer used, and a data-reading module for reading the data about a printer of an unknown type;

parameter-changing means for acquiring one or more printing parameters specific to the printer of an unknown type when the printer of the unknown type is connected to the video game apparatus, and for changing one or more parameters of the device engine module, which are stored in the nonvolatile memory, in accordance with the one or more printing parameters acquired; and printing control means for reading the printer driver from the nonvolatile memory, for acquiring one or more printing parameter from the printer by the use of the data-reading module when the printer of the unknown-type is connected to the video game apparatus, for changing one or more parameters of the device engine module in accordance with the one or more printing parameter acquired, for converting the contents data read from the video-game program recording medium by the video-game software program reading means to print data by the use of the printer driver, and for outputting the print data through a printer-connecting terminal, wherein the contents data for each privilege item is printed when execution of the video-game program indicates that a corresponding stage of the game has been reached.

3. A method of controlling a video game apparatus comprising:

reading a video-game software program from a video-game program recording medium, said video-game software program comprising a video-game program, contents data indicating at least one privilege item, and a printer driver for printing the contents data;

storing the printer driver into a nonvolatile memory, separate from the video-game program recording medium, said printer driver comprising a common engine module for processing data about the progress of the game, irrespective of the type of the printer used, a device engine module for processing the data in a particular manner specific to the type of the printer used, and a data-reading module for reading the data about a printer of an unknown type;

acquiring one or more printing parameters specific to a printer of an unknown type, when the printer of the unknown-type is connected to the video game apparatus, and changing one or more parameters of the device engine module in accordance with the one or more printing parameters acquired; and converting the contents data read from the video-game program recording medium to print data by the use of the printer driver, and printing the print data;

wherein the contents data for each privilege item is printed when execution of the video-game program indicates that a corresponding stage of the game has been reached.

4. The video game system of claim 1, wherein the video-game program recording medium is removable from the video-game software program reading means.

5. The video game system of claim 1, wherein:
- the video-game program is stored in a first contiguous section of the video-game program recording means,
- the contents data is stored in a second section of the video-game program recording means,
- the printer driver is stored in a third contiguous section of the video-game program recording means, and
- the first section, the second section, and the third section do not overlap.

6. The video game system of claim 1, wherein at least one privilege item is a coupon.

7. The video game apparatus of claim 2, wherein the video-game program recording medium is removable from the video-game software program reading means.

8. The video game apparatus of claim 2, wherein:

the video-game program is stored in a first contiguous section of the video-game program recording means, the contents data is stored in a second section of the video-game program recording means, the printer driver is stored in a third contiguous section of the video-game program recording means, and the first section, the second section, and the third section do not overlap.

9. The video game apparatus of claim 2, wherein at least one privilege item is a coupon.

10. The method of claim 3, wherein the video-game program recording medium is removable from the video-game software program reading means.

11. The method of claim 3, wherein:

the video-game program is stored in a first contiguous section of the video-game program recording means, the contents data is stored in a second section of the video-game program recording means, the printer driver is stored in a third contiguous section of the video-game program recording means, and the first section, the second section, and the third section do not overlap.

12. The method of claim 3, wherein at least one privilege item is a coupon.

* * * * *